United States Patent
Aboshi et al.

(10) Patent No.: US 9,423,681 B2
(45) Date of Patent: Aug. 23, 2016

(54) PROJECTION-TYPE DISPLAY APPARATUS HAVING A LASER LIGHT SOURCE

(71) Applicant: JVC KENWOOD Corporation, Yokohama-shi, Kanagawa-ku (JP)

(72) Inventors: Kazutaka Aboshi, Yokohama (JP); Motoshi Tohda, Yokohama (JP); Tatsuru Kobayashi, Yokosuka (JP)

(73) Assignee: JVC KENWOOD CORPORATION, Yokohama-shi, Kanagawa (JP)

( * ) Notice: Subject to any disclaimer, the term of this patent is extended or adjusted under 35 U.S.C. 154(b) by 134 days.

(21) Appl. No.: 14/337,580

(22) Filed: Jul. 22, 2014

(65) Prior Publication Data

US 2014/0333900 A1    Nov. 13, 2014

Related U.S. Application Data

(63) Continuation of application No. PCT/JP2012/079393, filed on Nov. 13, 2012.

(30) Foreign Application Priority Data

Jan. 26, 2012   (JP) ................ 2012-013802

(51) Int. Cl.
*G03B 21/20* (2006.01)
*G02B 27/48* (2006.01)
(Continued)

(52) U.S. Cl.
CPC .......... *G03B 21/208* (2013.01); *G02B 27/0905* (2013.01); *G02B 27/0933* (2013.01); *G02B 27/4261* (2013.01); *G02B 27/48* (2013.01); *G03B 21/2033* (2013.01);
(Continued)

(58) Field of Classification Search
CPC .......... G02B 27/0905; G02B 27/0933; G02B 27/4261; G02B 27/48; G02B 26/0816; G02B 27/0955; G02B 3/0006; G03B 21/2033; G03B 21/208; H04N 9/3129; H04N 9/3161; H04N 9/3164

See application file for complete search history.

(56) References Cited

U.S. PATENT DOCUMENTS

| | | | |
|---|---|---|---|
| 2003/0039036 A1* | 2/2003 | Kruschwitz | G02B 27/0927 359/707 |
| 2009/0092161 A1* | 4/2009 | Hung | G02B 26/105 372/29.01 |

FOREIGN PATENT DOCUMENTS

| | | | |
|---|---|---|---|
| JP | 2003098476 A | 4/2003 | |
| JP | 2008256824 A | 10/2008 | |

(Continued)

OTHER PUBLICATIONS

Search Report issued in International Application No. PCT/JP2012/079393 dated Nov. 13, 2012 three (3) pages.

*Primary Examiner* — Sultan Chowdhury
*Assistant Examiner* — Magda Cruz
(74) *Attorney, Agent, or Firm* — Nath, Goldberg & Meyer; Jerald L. Meyer; Christopher Thomas

(57) ABSTRACT

A beam, expansion unit is configured to expand a beam of laser light emitted from a laser light source into an ellipse. A beam irradiation position moving unit is configured to translate a mirror by a driving unit to sequentially move the laser light expanded into the ellipse on the surface of an integrator in a minor-axis direction of the ellipse. A reflective liquid crystal device is configured to modulate the laser light. A projection lens is configured to project the laser light modulated by the reflective liquid crystal device.

7 Claims, 10 Drawing Sheets

(51) Int. Cl.
   *H04N 9/31*   (2006.01)
   *G02B 27/09*  (2006.01)
   *G02B 27/42*  (2006.01)
   *G02B 3/00*       (2006.01)
   *G02B 26/08*      (2006.01)

(52) U.S. Cl.
   CPC .......... *H04N 9/3129* (2013.01); *H04N 9/3161* (2013.01); *H04N 9/3164* (2013.01); *G02B 3/0006* (2013.01); *G02B 26/0816* (2013.01); *G02B 27/0955* (2013.01)

(56) References Cited

FOREIGN PATENT DOCUMENTS

| | | |
|---|---|---|
| JP | 2009169012 A | 7/2009 |
| JP | 2012237813 A | 12/2012 |
| WO | 2005073798 A1 | 8/2005 |
| WO | 2006137326 A1 | 12/2006 |
| WO | 2007013221 A1 | 2/2007 |
| WO | 2008114502 A1 | 9/2008 |
| WO | 2011092843 A1 | 8/2011 |

\* cited by examiner

PROJECTION-TYPE DISPLAY APPARATUS HAVING A LASER LIGHT SOURCE

CROSS REFERENCE TO RELATED APPLICATION

This application is a Continuation of PCT Application No PCT/JP2012/079393, filed on Nov. 13, 2012, and claims the priority of Japanese Patent Application No. 2012-013802, filed on Jan. 26, 2012, the entire contents of all of which are incorporated herein by reference.

BACKGROUND

The present disclosure relates to a projection-type display apparatus including a laser light source.

In recent years, there has been an increasing demand for miniaturization of projection-type display apparatuses. The projection-type display apparatuses can be miniaturized by using semiconductor laser light sources (hereinafter, referred to as just a laser light source) instead of xenon lamps and ultrahigh pressure mercury lamps, which have been conventionally used.

However, the laser light sources have low light emission efficiency and high coherence to be used as the light sources of the projection-type display apparatuses. Especially, the high coherence thereof in particular, produces an interference pattern called speckle, and worsens the quality of projected images.

In order to solve this problem, various proposals have been made. Japanese Patent Laid-open Publication No 2009-169012 (Patent Literature 1) describes that continuous rotation of a prism or a mirror reduces speckle. Japanese Patent Laid-open Publication No. 2008-25682/1 (Patent Literature 2) describes that translating a reflection plate in a reciprocating manner reduces speckle.

SUMMARY

The configurations described in Patent Literatures 1 and 2 provide insufficient effect to reduce speckle, and there is a demand for a configuration capable of reducing speckle more effectively.

An object of the embodiments is to provide, a projection-type display apparatus capable of reducing speckle more effectively.

An aspect of the embodiments provides a projection-type display apparatus comprising: a laser source; a beam expansion unit configured to expand a beam, of laser light emitted from the laser light source into an ellipse; an integrator which is irradiated by the laser light expanded into an ellipse by the beam expansion unit; a beam irradiation position moving unit configured to sequentially move the laser light expanded into an ellipse on the surface of the integrator in a minor-axis direction of the ellipse; a modulation device configured to modulate the laser light emitted from the integrator; and a projection lens configured to project the laser light modulated by the modulation device.

DETAILED DESCRIPTION

Hereinafter, a description is given of a projection-type display apparatus of each embodiment with reference to the accompanying drawings.

First Embodiment

Figure 1:
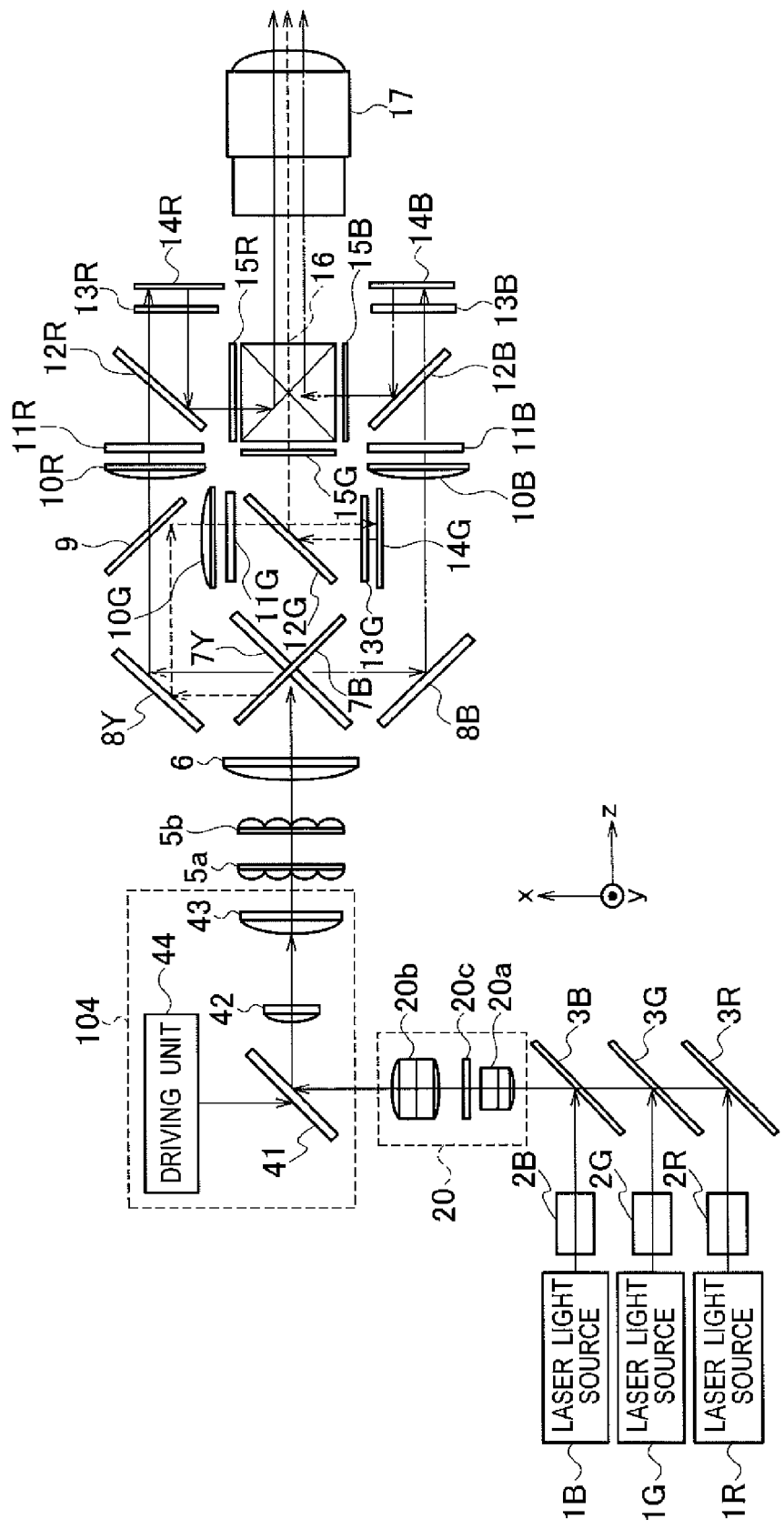
FIG. 1 is a configuration diagram illustrating a projection-type display apparatus of the first embodiment.

In FIG. 1, laser light sources 1R, 1G, and 1B, which are composed of laser diodes, emit red light, green light, and blue light, respectively. Beam expanders 2R, 2G, and 2B, which are composed of lenses, collimate the incident red, green, and blue light, respectively.

A mirror 3R reflects the red light emitted from the beam expander 2R to fold the optical path thereof by 90°. A dichroic mirror 3G reflects the green light emitted from the beam. expander 2G to fold the optical path thereof by 90°, combines the red light and green light, and emits the combined light, A dichroic mirror 3B reflects the blue light emitted from the beam expander 2B to fold the optical path thereof by 90° and combines and emits the blue light and the red and green combined light. The dichroic mirror 3B thereby emits three-primary color combined light including the red, green, and blue light, combined.

The three-primary color combined light is incident on a beam expansion unit 20. The beam expansion unit 20 includes afocal lenses 20a. and 20b and a hologram polarizer 20c located between the afocal lenses 20a and 20b.

Each of the afocal lenses 20a and 20b is composed of a combination of convex and concave lenses. The afocal lenses 20a and 20b constitute an afocal lens system. The beam of the three-primary color combined light, is circular, and the afocal lenses 20a and 20b enlarge the circular beam. The hologram polarizer 20c expands the beam, of three-primary color combined light into a vertical ellipse.

The beam of three-primary color combined light expanded by the beam expansion unit 20 passes through a beam irradiation position moving unit 104 to be incident on an integrator 5a, which is composed of fly-eye lenses. The beam irradiation. position moving unit 104 includes a mirror 41, collimator lenses 42 and 43, and a driving unit 44. The operation of the beam irradiation position moving unit 104 is described later.

To the light emission side of the integrator 5a, an integrator 5b, which is composed of fly-eye lenses, is provided. Each of the integrators 5a and 5b has a form where a plurality of rectangular lens cells is arranged in the directions x and y.

The three-primary color combined light incident on individual cells of the integrator 5a is incident on the respective cells of the integrator 5b. The three-primary color combined light emitted from each cell of the integrator 5b is collected by a condenser lens 6 and is incident on dichroic mirrors 7Y and 7B.

The dichroic mirror 7Y separates a mixture of red and green light from the three-primary color combined light, and the dichroic mirror 7B separates blue light from the three-primary color combined light. In FIG. 1, the red light is indicated by solid lines, the green light is indicated by dashed lines, and the blue light is indicated by dashed-dotted lines in optical paths after the dichroic mirrors 7Y and 7B.

A mirror 8Y reflects the mixture of red and green light to fold the optical path thereof by 90°, and a mirror 8B reflects the blue light to fold the optical path thereof by 90°. The mixture of red and green light is incident on a dichroic mirror 9, and the blue light is incident on a field lens 10B.

The dichroic mirror 9 transmits the red light and reflects the green light to fold the optical path thereof by 90°. The red light transmitted through the dichroic mirror 9 is incident on a field lens 10R. The green light with the optical path folded by the dichroic mirror 9 is incident on a field lens 10G. The field lenses 10R, 10G, and 10B are collectively referred to as field lenses 10.

The red, green, and blue light emitted from the field lenses 10 passes through polarization plates 11R, 11G, and 11B, each serving as a polarizer, to be incident on wire grid-type polarization beam splitters (PBSs) 12R, 12G, and 12B, respectively.

Each of the PESs 12R, 12G, and 12B transmits any one of the P-polarized component and the S-polarized component of the red, green, and blue light only the P-polarized component, for example. The P-polarized components of the red, green, and blue light are transmitted through compensators 13R, 13G, and 13B, which control the polarization directions to compensate the angular characteristics, and are incident on reflective liquid crystal devices (modulation devices) 14R, 14G, and 14B. The reflective liquid crystal devices 14R, 14G, and 14B are collectively referred to as reflective liquid crystal devices 14.

The red, green, and blue light incident on the reflective liquid crystal devices 14 are respectively modulated in accordance with the red, green, and blue components of the image signal to be converted into S-polarized components.

The S-polarized components of the red, green, and blue light which are reflected on the reflective liquid crystal devices 14 to be emitted are transmitted through the compensators ISP, 13G, and 13B again, and incident on the PESs 12R, 12G, and 12B, respectively. The PESs 12R, 12G, and 12B, reflect the S-polarized components of the red, green, and blue light to fold the optical paths thereof by 90°.

The S-polarized components of the red, green, and blue light respectively pass through polarization plates 15R, 15G, and 15B, which serve as analyzers, and are incident on a cross-dichroic prism 16. The cross-dichroic prism 16 combines the red, green, and blue light, and a projection lens 17 projects the combined light onto a not-shown screen.

Figure 2:
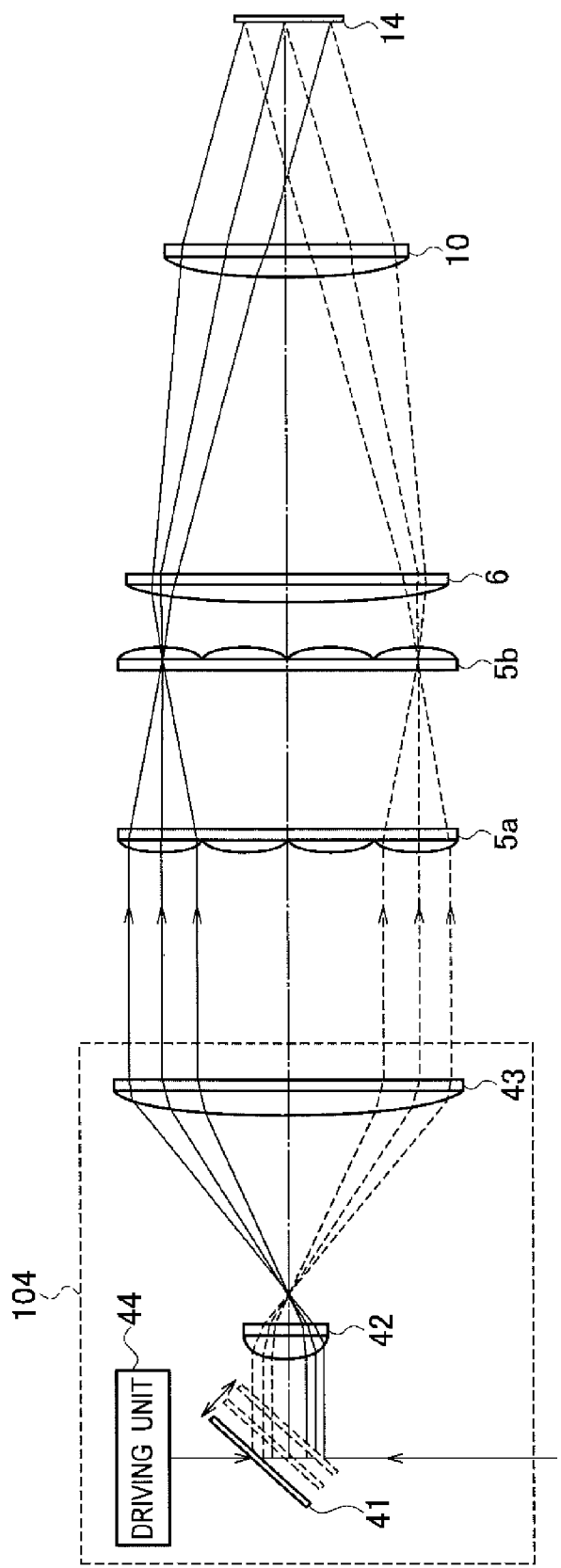
FIG. 2 is a simplified conceptual diagram of the configuration illustrated in FIG. 1, explaining the operation of a beam irradiation position moving unit 104.
Figure 3:
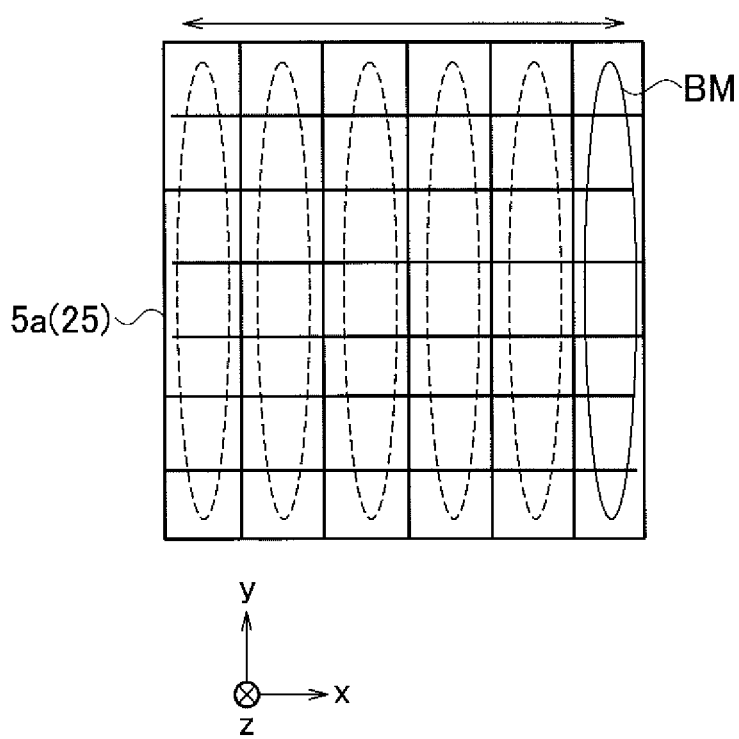
FIG. 3 is a diagram for explaining the operation of each embodiment.

Next, using FIGS. 2 and 3, a description is given of the operation of the beam irradiation position moving unit 104 and the reason why speckle can be reduced.

The screen has a rough surface. When laser light, which is coherent, is incident on the rough surface, scattering rays of laser light reflected on the rough surface interfere with each other to form a random pattern as speckle. Speckle is produced depending on the surface profile of the rough surface and the incident angle of laser light. The surface profile of the rough surface, which is the surface of the screen, never changes, and speckle therefore depends on the incident angle of laser light. Accordingly, speckle changes when the incident angle of laser light changes.

FIG. 2 is a simplified configuration diagram conceptually illustrating the configuration of FIG. 1. In FIG. 2, the light rays emitted from one side of the collimator lens 43 in the direction x are indicated by solid lines, and the light rays emitted from the other side thereof in the direction x are indicated by dashed lines. In the integrator illumination optical system using the integrators 5a and 5b, the collimated light is incident on the entire surface of the integrator 5a.

The light incident on the integrator 5a is transmitted sequentially through the integrator 5b, condenser lens 6, and field lens 10 to be incident on the reflective liquid crystal devices 14 as telecentric beams.

The light rays incident on each cell of the integrator 5a are incident on the reflective liquid crystal devices 14 at a particular angle. The incident angle of light on the reflective crystal display devices 14 depends on the cell of the integrator 5a through which the light is transmitted.

Accordingly, the incident angle of light incident on the screen surface differs cell by cell, and the produced speckle differs cell by cell. If different patterns of speckle sequentially appear, the human's eyes cannot sense the speckle, thus implementing reduction of speckle.

Accordingly, in the beam irradiation position moving unit 104, the mirror 41 is translated in the direction vertical to the surface of the mirror 41 by the driving unit 44 as shown by dashed lines. The mirror 41 is driven by the driving unit to reciprocate within a predetermined time. The displacement of the mirror 41 may be within 200 to 300 µm. The driving unit 44 can be composed of a voice coil motor, for example. As the mirror 41 is translated in the direction vertical to the surface of the mirror 41, the position of reflection of the laser light moves on the mirror 41.

Accordingly, the light which is passed through the collimator lenses 42 and 43 to be incident on the integrator 5a is sequentially projected onto different positions of the integrator 5a.

FIG. 3 illustrates the state where a beam BM formed into a vertical ellipse by the beam expansion unit 20 sequentially moves in the direction x on the integrator 5a by the reciprocation of the mirror 41.

Preferably, the beam expansion unit 20 enlarges the beam through the afocal lenses 20a and 20b so that the beam can irradiate the entire width of each cell of the integrator 5a in the direction x. Certainly, the beam may be enlarged so as to exceed the width of each cell in the direction x.

Moreover, the beam is preferably expanded into a vertical ellipse by the hologram polarizer 20c so that the beam can simultaneously irradiate all of the cells arranged in the direction y. Certainly, the beam may be expanded so as to be longer than the length of the integrator 5a in the direction y.

According to the first embodiment, therefore, speckle can be reduced more effectively than the conventional examples. Furthermore, in the first embodiment, as the preferable configuration, the beam is enlarged by the collimator lenses 42 and 43 before being projected onto the integrator 5a in addition to the configuration where the mirror 41 is just reciprocated. Accordingly, speckle can be reduced more effectively.

In the first embodiment, as apparent from FIG. 3, the beam BM can irradiate all the cells of the integrator 5a. The light projected onto the reflective liquid crystal device 14 via the integrators 5a and 5b is integrated light of rays emitted from the individual cells of the integrators 5a and 5b.

The frequency at which the mirror 41 is vibrated is preferably set so that the human eyes do not recognize flicker and is preferably equal to or more than 60 Hz.

Second Embodiment

Figure 4:
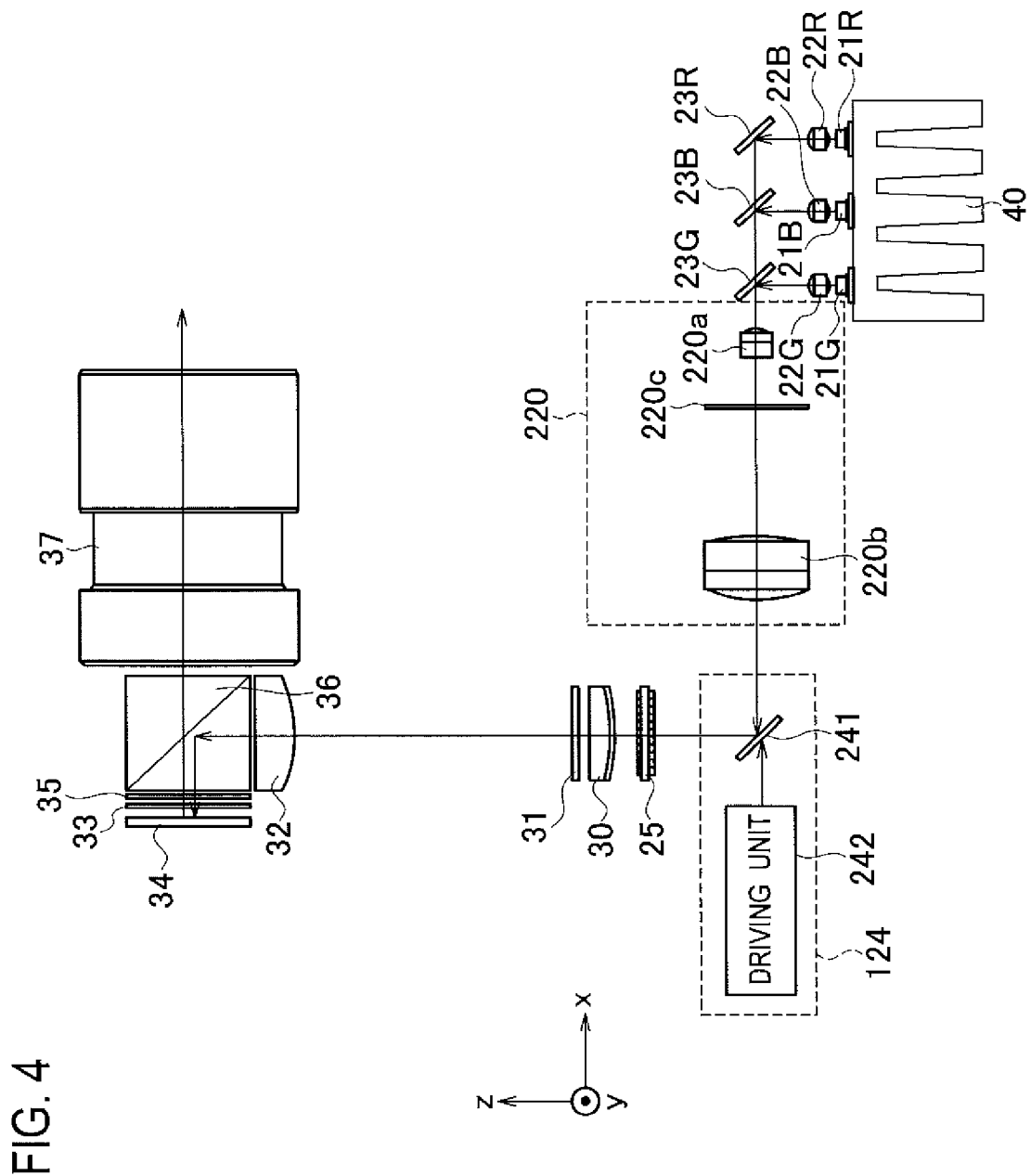
FIG. 4 is a configuration diagram illustrating a projection-type display apparatus of the second embodiment.

In FIG. 4, laser light sources 21R, 21G, and 21B, which are composed of laser diodes, are attached to a heat sink 40. The laser light sources 21R, 21G, and 21B emit red, green, and blue light, respectively.

Collimator lenses 22R, 22G, and 22B collimate the incident red, green, and blue light into approximately collimated light, respectively. The collimator lenses 22R, 22G, and 22B are substantially the same as the beam expanders 2R, 2G, and 2B of the first embodiment, respectively.

A mirror 23R reflects the red light, emitted from the collimator lens 22R to fold the optical path thereof by 90°. A dichroic mirror 23B transmits the red light, and reflects the blue light emitted from the collimator lens 22B to fold the optical path thereof by 90°. A dichroic mirror 23G transmits the red and blue light and reflects the green light emitted from the collimator lens 22G to fold the optical path thereof by 90°.

The laser light sources 21R, 21G, and 21B sequentially emit light in a time-division manner at regular time intervals. The optical paths of the red, green, and blue light are thereby integrated into one.

The red, green, and blue light is individually incident on a beam expansion unit 220. The beam expansion unit 220 includes afocal lenses 220a and 220b and a hologram polarization device 220c provided between the afocal lenses 220a and 220b. Each of the afocal lenses 220a and 220b is composed of a combination of convex and concave lenses. The afocal lenses 220a and 220b constitute an afocal lens system.

Each beam of red, green, and blue light is circular, and the afocal lenses 220a and 220b enlarge the circular beam. The hologram polarizer 220c expands the beam of red, green, and blue light into a vertical ellipse.

The beam of red, green, and blue light expanded by the beam expansion unit 220 passes through a beam irradiation position moving unit 124 to be incident on an integrator 25, which is composed of a fly-eye lens. The beam irradiation position moving unit 124 includes a mirror 241 and a driving unit 242. The operation of the beam irradiation position moving unit 124 is described later.

The integrator 25 of the second embodiment includes a plurality of fine lenses arranged in the directions x and y on both sides of the integrator 25. The integrator 25 can be configured in such a manner that a plurality of lens cells is formed on both sides of an approximately 1 mm thick sheet of a resin material, for example. The red, green, and blue light emitted from each cell of the integrator 25 is incident on the field lens 30.

In the second embodiment, the integrator 25 is used to miniaturize the projection-type display apparatus. Compared with the case of using the integrators 5a and 5b in the first embodiment, projection-type display apparatus of the second embodiment includes a single integrator and can be therefore miniaturized.

Furthermore, when the cells of the integrator 25 are miniaturized to the focal distance of the lens composed of each cell, the focal distance of the field lens 30 can be set short. This can shorten the optical path length and can therefore reduce the capacity of the optical, system.

The red, green, and blue light is collected by the field lens 30 so that the light transmitted through each cell of the integrator 25 is projected onto the reflective liquid crystal device 34. The polarization of the red, green, and blue light emitted from the field lens 30 is equally adjusted by the polarization plate 31. The red, green, and blue light is equally S-polarized in the second embodiment. The S-polarized component of the red, green, and blue light passes through the field lens 32 and is reflected on the joint plane of the PBS prism 36 with the optical path thereof folded by 90°.

On the joint plane of the PBS prism 36, dichroic film configured to reflect S-polarized components and transmit P-polarized components is formed. The S-polarized components pass through a quarter wavelength plate 35 and a phase compensator 33 and are incident on the reflective crystal liquid device 34.

Since the laser light sources 21R, 21G, and 21B sequentially emit light in a time-division manner as described above, the S-polarized components of the red, green, and blue light are sequentially incident on the reflective liquid crystal device 34. The S-polarized components of the red, green, and blue light incident on the reflective liquid crystal device 14 are modulated in accordance with the red, green, and blue components of the image signal and are converted into P-polarized components.

The second embodiment is a so-called single-plate projection-type display apparatus including the single reflective liquid crystal device 34, which can be therefore miniaturized.

The P-polarized components of the red, green, and blue light which are reflected on the reflective liquid crystal device 34 and emitted pass through the phase compensator 33 and quarter wavelength plate 35 again and is then incident on the PBS prism 36. The P-polarized components are transmitted through the joint plane of the PBS prism 36, and the projection lens 37 sequentially projects the red, green, and blue light onto a not-shown screen in the time-sharing manner.

Figure 5:
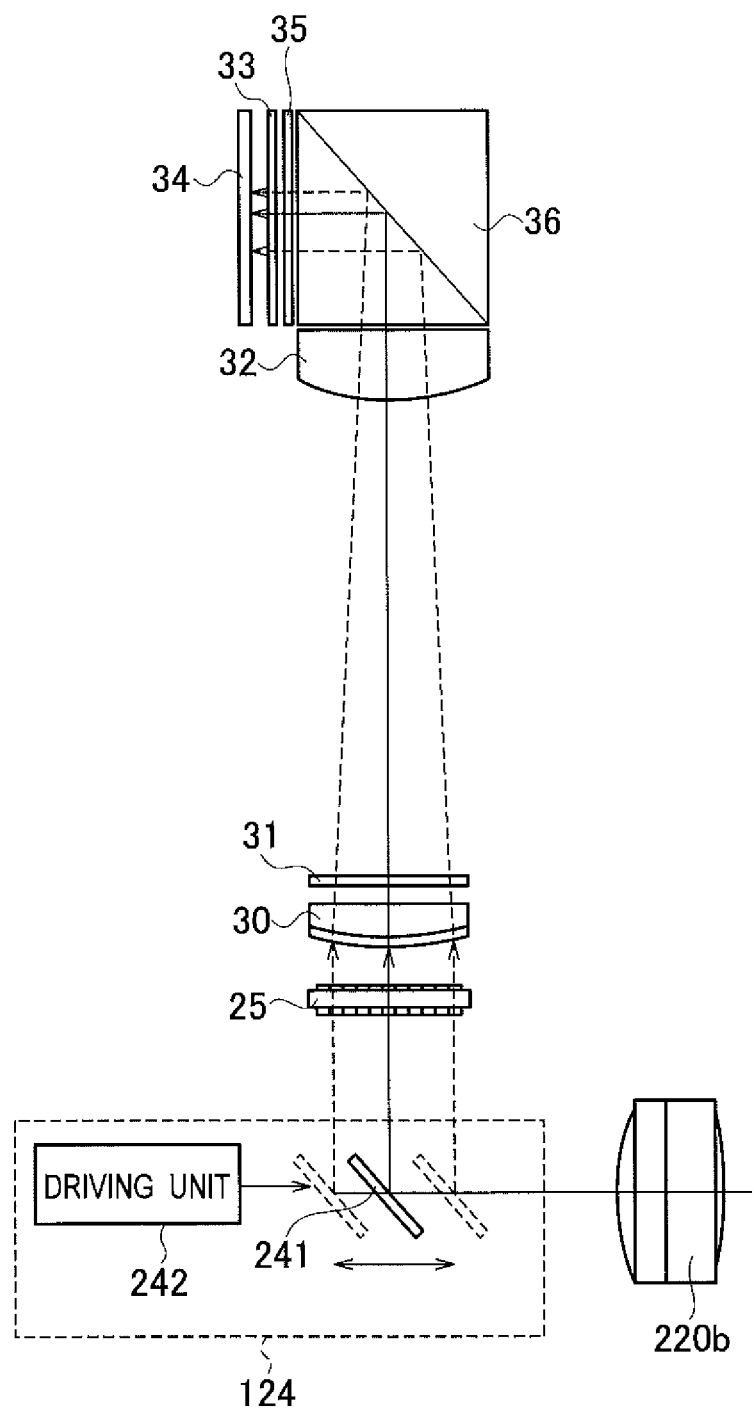
FIG. 5 is a configuration diagram of a part of FIG. 4 for explaining the operation of abeam irradiation position moving unit 124.

Next, the operation of the beam irradiation position moving unit 124 is described. FIG. 5 is a part of the configuration of FIG. 4.

As illustrated in FIG. 5, in the beam irradiation position moving unit 124, the mirror 241 is translated by the driving unit 212 as shown by dashed lines. The mirror 241 is translated with the angle thereof kept at 45 degrees with respect to the direction orthogonal to the optical axis. The mirror 241 is driven by the driving unit 242 to reciprocate within a predetermined period of time. The driving unit 242 can be composed of a voice coil motor, for example.

When the mirror 241 is translated, the position of incidence of the laser light reflected on the mirror 241 moves on the integrator 25. Accordingly, the incoming light to the integrator 25 is sequentially projected onto different positions on the integrator 25.

When the red, green, and blue light irradiates all the lines of the integrator 25 in synchronization with switching of the red, green, and blue light, the red, green, and blue light which is transmitted through every cell varying with time can irradiate the reflective liquid crystal device 34. When the red, green, and blue light is switched at 60 Hz, the illuminating light needs to reciprocate three times every 1/60 seconds over the lines of the cells of the integrator 25.

In the second embodiment, similarly to FIG. 3, the beam BM can irradiate all the cells of the integrator 25. The interference pattern of the laser light changes every predetermined period of time, and a human's eyes cannot sense speckle, thus implementing reduction of speckle.

In the second embodiment, the integrator 25, which includes fly-eye lens cells on the both sides, is used for the purpose of miniaturization. However, the second embodiment may use two integrators in a similar manner to the first embodiment.

Third Embodiment

Figure 6:
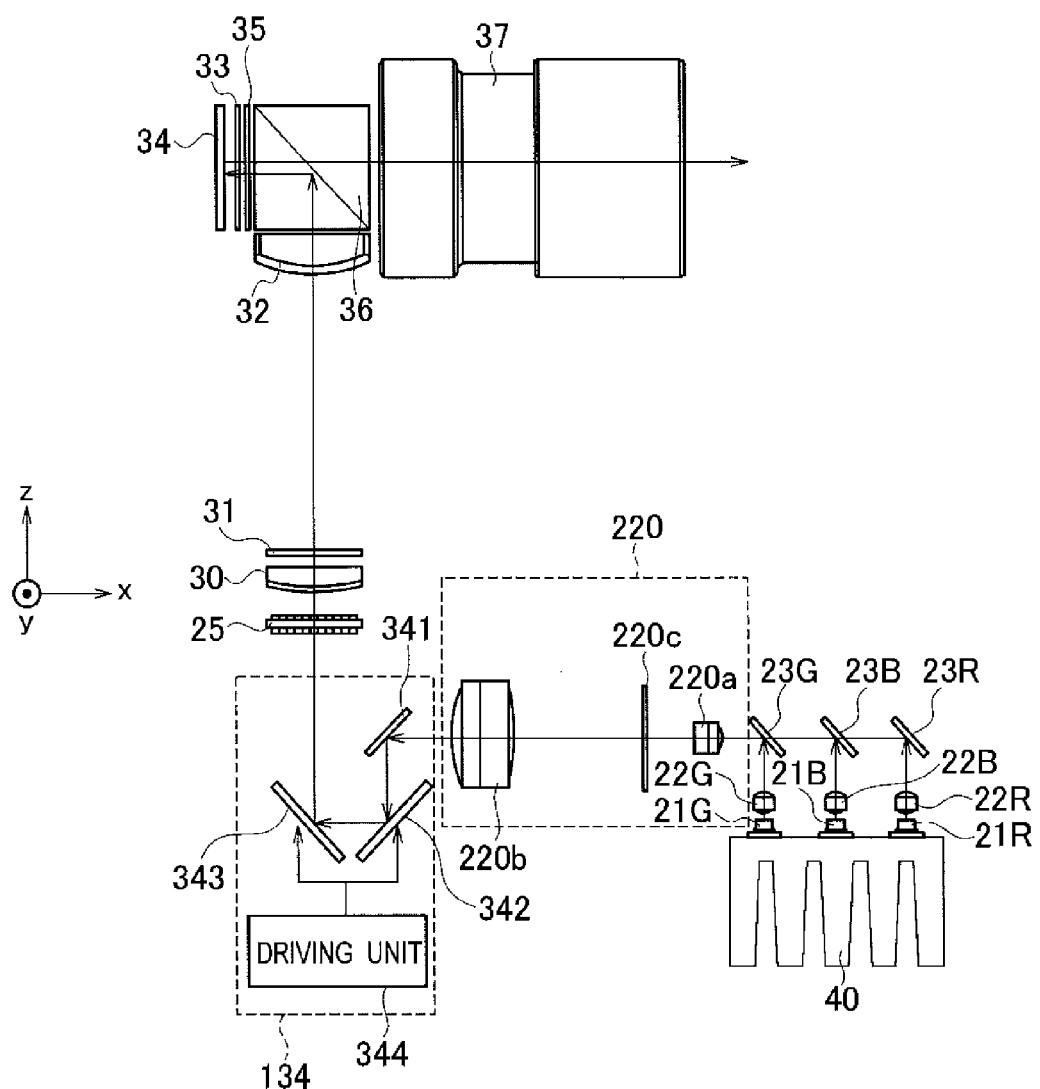
FIG. 6 is a configuration diagram illustrating a projection-type display apparatus of the third embodiment.

In a third embodiment illustrated in FIG. 6, the same portions as those of the second embodiment, described in FIG. 4 are given the same reference numerals, and the description thereof is omitted. In the third embodiment illustrated in FIG. 6, a beam irradiation position moving unit 134 is provided instead of the beam irradiation position moving unit 124 of the second embodiment. The beam irradiation position moving unit 134 includes a mirror 341, moving mirrors 342 and 343, and a driving unit 344.

Red, green, and blue light emitted from the afocal lens 220b is reflected on the mirror 341 to fold the optical path thereof by 90° and is then incident on the moving mirror 342. The red, green, and blue light reflected on the moving mirror 342 is further reflected on the moving mirror 343 to be incident on the integrator 25. In the state illustrated in FIG. 6, the moving mirrors 342 and 343 are at 45° with respect to the travel direction of the red, green, and blue light.

Figure 7A:
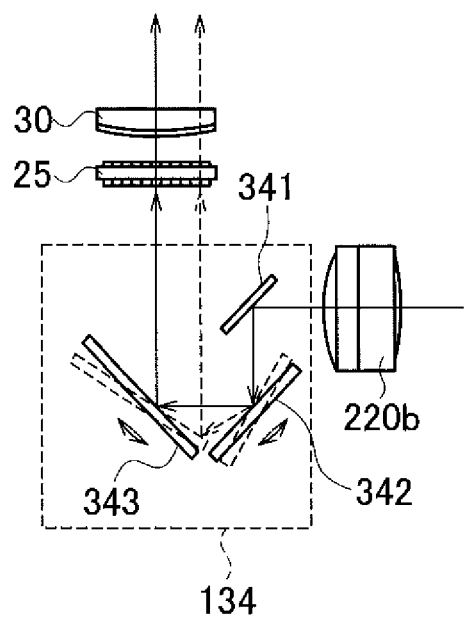
FIGS. 7A and 7B are configuration diagrams of a part of FIG. 6 for explaining the operation of a beam, irradiation position moving unit 134.
Figure 7B:
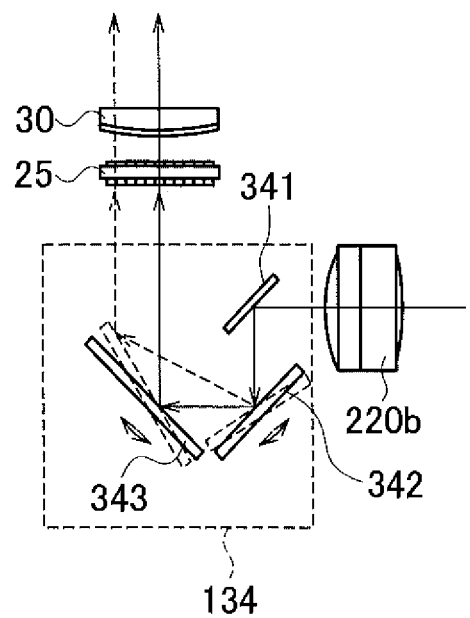

Using FIGS. 7A and 7B, the operation of the beam irradiation position moving unit 134 is described. FIGS. 7A and 7B show a part the configuration of FIG. 6. FIGS. 7A and 7B do not show the driving unit 344. The beam irradiation position moving unit 134 rotates both the moving mirrors 342 and 343 counterclockwise by a same angle in FIG. 7A through the driving unit 344 as shown by dashed lines in FIG. 7A.

The beam irradiation position moving unit 134 rotates both the moving mirrors 342 and 343 clockwise in FIG. 7B by a same angle through the driving unit 344 as shown by dashed lines of FIG. 7B.

In this way, in the third embodiment, the moving mirrors 342 and 343 are driven by the driving unit 344 to rotate in a reciprocating manner by a same angle in a same direction in synchronization. The moving mirrors 342 and 343 are both rotated within +/−14 degrees, for example.

As both the moving mirrors 342 and 343 rotate in a reciprocating manner, as illustrated in FIGS. 7A and 7B, the position of incidence of the laser light reflected on the moving mirror 343 moves on the integrator 25. The incoming light to the integrator 25 is sequentially protected onto different positions on the integrator 25.

In the third embodiment, in a similar manner to FIG. 3, the beam BM can irradiate all the cells of the integrator 25. The interference pattern of the laser light changes every predetermined period of time, and the human's eyes cannot therefore sense speckle, thus implementing reduction of speckle.

Fourth Embodiment

Figure 8:
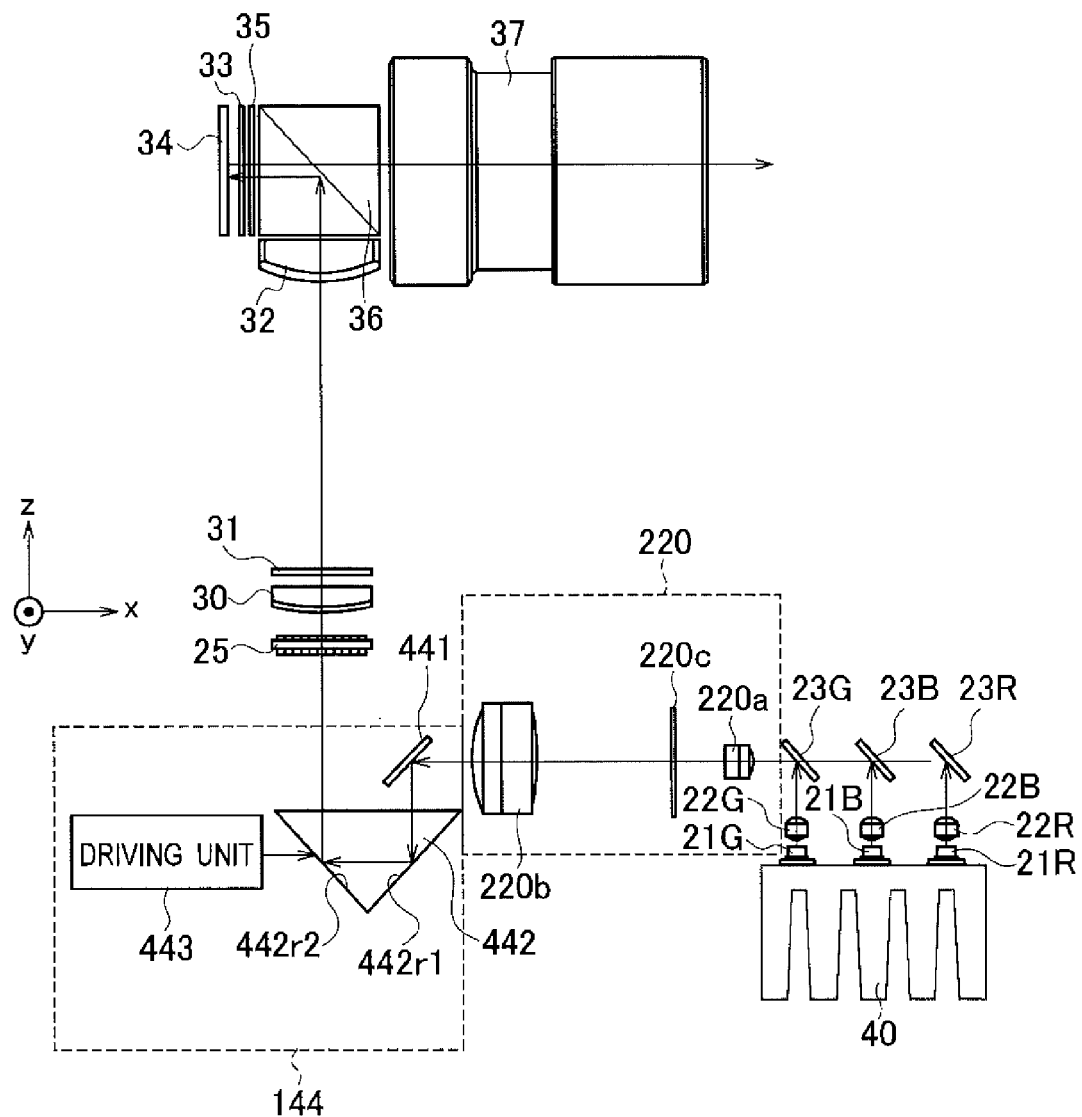
FIG. 8 is a configuration diagram illustrating a projection-type display apparatus of the fourth embodiment.

In a fourth embodiment illustrated in FIG. 8, the same portions as those of the second embodiment described in FIG. 4 are given same reference numerals, and the description thereof is omitted. In the fourth embodiment illustrated in FIG. 8, a beam irradiation position moving unit 144 is provided instead of the beam irradiation position moving unit 124 of the second embodiment. The beam irradiation position moving unit 144 includes a mirror 441, a moving prism 442, and a driving unit 443.

Red, green, and blue light emitted from the afocal lens 220b is reflected on the mirror 441 to fold the optical path thereof by 90° and is then incident on the moving prism 442. The red, green, and blue light reflected on a reflective film 442r1 of the moving prism 442 is then reflected on a reflective film 442r2 to be incident on the integrator 25. In the state 110 illustrated in FIG. 8, the reflective films 442r1 and 442r2 of the moving prism 442 are inclined at 45 degrees with respect to the travel direction of the red, green, and blue light.

Figure 9A:
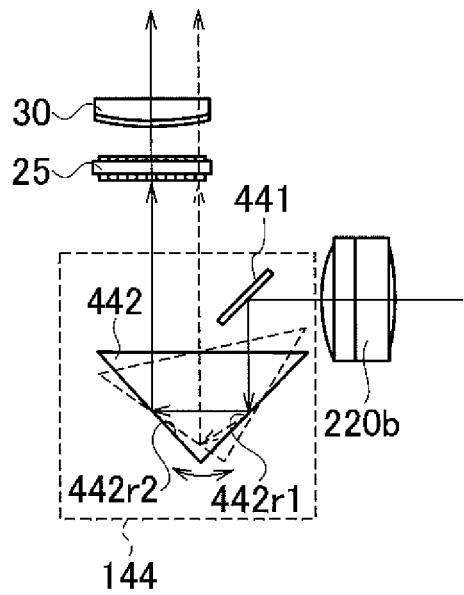
FIGS. 9A and 9B are configuration diagrams of a part of FIG. 8 for explaining the operation of a beam irradiation position moving unit 144.
Figure 9B:
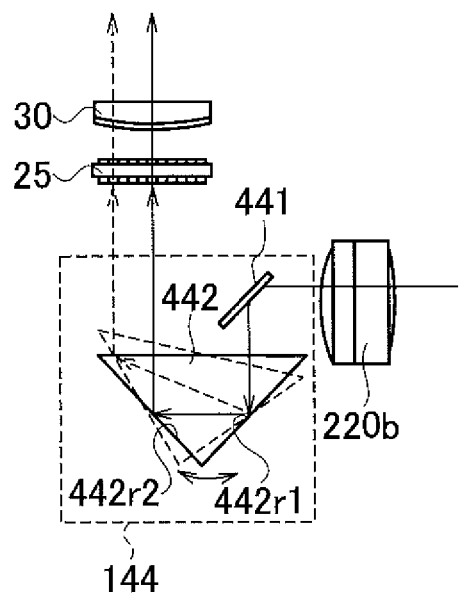

Using FIGS. 9A and 9B, the operation of the beam irradiation position moving unit 144 is described. FIGS. 9A and 9B show a part of the configuration of FIG. 8. FIGS. 9A and 9B do not show the driving unit 443.

The beam irradiation position moving unit 144 rotates the moving prism 442 counterclockwise in FIG. 9A by a predetermined angle through the driving unit 443 as shown by dashed lines in FIG. 9A.

The beam irradiation position moving unit 144 rotates the moving prism 442 clockwise in FIG. 9B by a predetermined angle through the driving unit 443 as shown by dashed lines of FIG. 9B.

In this way, in the fourth embodiment, the moving prism 442 is driven by the driving unit 443 to rotate by a predetermined angle in a reciprocating manner. The moving prism 442 is rotated in a range of +/−12 degrees, for example.

As the moving prism 442 rotates in a reciprocating manner, as illustrated in FIGS. 9A and 9B, the position of incidence of the laser light reflected on the reflective film 442r2 of the moving prism 442 moves on the integrator 25. The incoming light to the integrator 25 is therefore sequentially projected at different positions on the integrator 25.

In the fourth embodiment, in a similar manner to FIG. 3, the beam BM can irradiate all the cells of the integrator 25. The interference pattern of the laser light changes every predetermined period of time, and the human's eyes therefore cannot sense speckle, thus implementing reduction of speckle.

Fifth Embodiment

Figure 10:
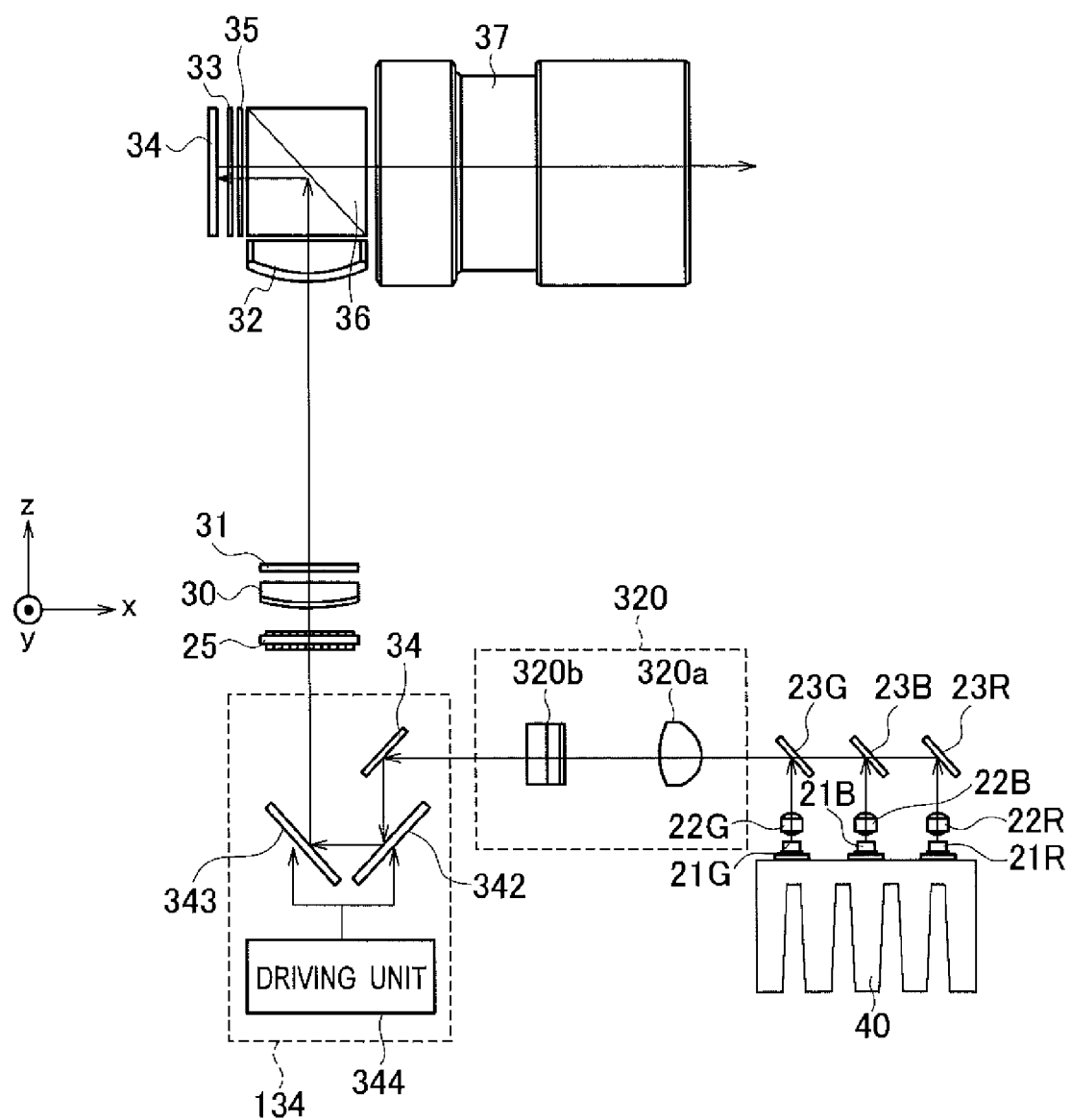
FIG. 10 is a configuration diagram illustrating a projection-type display apparatus of the fifth embodiment.

In a fifth embodiment illustrated in FIG. 10, the beam expansion unit 220 in the third embodiment illustrated in FIG. 6 is replaced with a beam expansion unit 320 as another configuration of the beam expansion unit. In FIG. 10, the same portions as those of FIG. 6 are given the same reference numerals, and the description thereof is omitted.

The beam expansion unit 320 includes a pair of cylindrical lenses 320a and 320b. The cylindrical lenses 320a and 320b constitute an afocal lens system. The width of the beam of red, green, and blue light collimated, can be expanded by the afocal lens system composed of the pair of cylindrical lenses 320a and 320b. The widths of the beam can be individually controlled in the direction x and y by the cylindrical lenses 320a and 320b.

FIG. 10 shows a configuration in which the beam expansion unit 320 is replaced with the beam expansion unit 220 of the third embodiment illustrated in FIG. 6. However, the beam expansion unit 320 can be employed also in the first embodiment illustrated in FIG. 1, the second embodiment illustrated in FIG. 2, and the fourth embodiment illustrated in FIG. 8 instead of the beam expansion units 20 and 220.

As described above, according to the projection-type display apparatus of each embodiment, it is possible to reduce effectively reduce speckle generated by the high coherence of laser light sources.

The present invention is not limited by the embodiments described above and can be changed variously without departing from the spirit of the invention.

What is claimed is:
1. A projection-type display apparatus comprising:
a laser source;
a beam expansion unit configured to expand a beam of laser light emitted from the laser light source into an ellipse;
an integrator which is irradiated by the laser light expanded into an ellipse by the beam expansion unit;

a beam irradiation position moving unit configured to sequentially move the laser light expanded into an ellipse on the surface of the integrator in a minor-axis direction of the ellipse;

a modulation device configured to modulate the laser light emitted from the integrator; and a projection lens configured to project the laser light modulated by the modulation device, wherein the integrator has a plurality of rectangular lens cells arranged in a first direction and a second direction, wherein the beam expansion unit is configured to expand the beam of the laser light into the ellipse so that the laser light irradiates all the lens cells of the integrator arranged in the first direction, and wherein the beam irradiation position moving unit is configured to sequentially move the laser light so that the laser light irradiates all the lens cells of the integrator arranged in the second direction.

2. The projection-type display apparatus according to claim 1, wherein the beam expansion unit includes a pair of afocal lenses and a hologram polarizer.

3. The projection-type display apparatus according to claim 1, wherein the beam expansion unit includes a pair of cylindrical lenses.

4. The projection-type display apparatus according to claim 1, wherein the beam irradiation position moving unit includes:

a mirror reflecting the laser light expanded into an ellipse by the beam expansion unit; and a driving unit translating the mirror in a reciprocating manner.

5. The projection-type display apparatus according to claim 4, further comprising a lens expanding the laser light reflected on the mirror.

6. The projection-type display apparatus according to claim 1, wherein the beam irradiation position moving unit includes:

a mirror configured to reflect the laser light expanded into an ellipse by the beam expansion unit;

a first moving mirror configured to reflect the laser light reflected on the mirror;

a second moving mirror configured to reflect the laser light reflected on the first moving mirror; and a driving unit configured to rotate both the first and second mirrors in synchronization by a same angle in a same direction in a reciprocating manner.

7. The projection-type display apparatus according to claim 1, wherein the beam irradiation position moving unit includes:

a mirror configured to reflect the laser light expanded into an ellipse by the beam expansion unit;

a moving prism having a first reflective film configured to reflect the laser light reflected on the mirror, and a second reflective film configured to reflect the laser light reflected on the first reflective film; and a driving unit configured to rotate the moving prism by a predetermined angle in a reciprocating manner.

* * * * *